US010883896B2

(12) United States Patent
Kamiya et al.

(10) Patent No.: US 10,883,896 B2
(45) Date of Patent: Jan. 5, 2021

(54) STATE MONITORING SYSTEM OF GEAR DEVICE AND STATE MONITORING METHOD

(71) Applicant: NTN CORPORATION, Osaka (JP)

(72) Inventors: Kohei Kamiya, Kuwana (JP); Hideyuki Tsutsui, Kuwana (JP)

(73) Assignee: NTN CORPORATION, Osaka (JP)

( * ) Notice: Subject to any disclaimer, the term of this patent is extended or adjusted under 35 U.S.C. 154(b) by 191 days.

(21) Appl. No.: 16/146,049

(22) Filed: Sep. 28, 2018

(65) Prior Publication Data

US 2019/0033169 A1 Jan. 31, 2019

Related U.S. Application Data

(63) Continuation of application No. PCT/JP2017/012149, filed on Mar. 24, 2017.

(30) Foreign Application Priority Data

Mar. 30, 2016 (JP) ................................. 2016-068285
Mar. 30, 2016 (JP) ................................. 2016-068286
Mar. 30, 2016 (JP) ................................. 2016-068287

(51) Int. Cl.
*G01M 13/021* (2019.01)
*G01M 13/02* (2019.01)
(Continued)

(52) U.S. Cl.
CPC ............ *G01M 13/021* (2013.01); *F03D 17/00* (2016.05); *F16H 57/01* (2013.01); *G01H 17/00* (2013.01);
(Continued)

(58) Field of Classification Search
CPC ... F03D 17/00; G01M 13/028; G01M 13/021; G01M 13/02; G01M 15/12; G01N 29/12;
(Continued)

(56) References Cited

U.S. PATENT DOCUMENTS 4,550,603 A * 11/1985 Fukada ..................... G01H 3/08
73/587
5,594,175 A * 1/1997 Lyon ....................... F16K 31/04
73/593
(Continued)

FOREIGN PATENT DOCUMENTS

CN 201016849 2/2008
CN 103821673 5/2014
(Continued)

OTHER PUBLICATIONS

Yuan et al, Gearbox diagnosis using a modified Fourier series, Proceedings of the 2003 IEE/ASME International Conference on Advanced Intelligent Mechatronics (AIM 2003) (Year: 2003).*
(Continued)

*Primary Examiner* — Peter J Macchiarolo

(57) ABSTRACT

A state monitoring system for monitoring state of a gear device having a plurality of gear pairs has a meshing frequency determination device. The meshing frequency determination device includes a maximum-peak-amplitude calculation unit that calculates a maximum peak amplitude from a detected meshing vibration, in estimated frequency ranges and a set harmonic region, and selects such estimated frequencies that a difference in maximum peak amplitude between a plurality of estimated frequency ranges, is less than or equal to a predetermined multiple, and a meshing frequency determination unit that determines an estimated frequency having a total value of maximum peak amplitudes calculated in the plurality of estimated frequency ranges, within a predetermined time, being the k-th (k is a natural number) greatest among the selected estimated frequencies, as a meshing frequency of a gear pair having the k-th highest tooth surface speed.

8 Claims, 8 Drawing Sheets

(51) Int. Cl.
| | | |
|---|---|---|
| *G01H 17/00* | (2006.01) | |
| *F03D 17/00* | (2016.01) | |
| *F16H 57/01* | (2012.01) | |
| *G01M 13/028* | (2019.01) | |
| *F03D 15/00* | (2016.01) | |

(52) U.S. Cl.
CPC .......... *G01M 13/02* (2013.01); *G01M 13/028* (2013.01); *F03D 15/00* (2016.05); *F05B 2260/40311* (2013.01); *F05B 2260/80* (2013.01); *F16H 2057/012* (2013.01)

(58) Field of Classification Search
CPC ............ G01N 29/46; G01N 2291/2696; F16H 2057/012; F16H 2057/02078; G01H 17/00
See application file for complete search history.

(56) References Cited

U.S. PATENT DOCUMENTS

| | | | |
|---|---|---|---|
| 6,507,789 B1 | 1/2003 | Reddy et al. | |
| 6,898,975 B2 | 5/2005 | Blunt | |
| 7,860,663 B2 | 12/2010 | Miyasaka et al. | |
| 8,800,354 B2 | 8/2014 | Shoda | |
| 2003/0130810 A1* | 7/2003 | Smulders | G01N 29/12 702/56 |
| 2004/0168855 A1* | 9/2004 | Leon | A62B 1/08 182/236 |
| 2004/0200283 A1 | 10/2004 | Blunt | |
| 2005/0247132 A1* | 11/2005 | Hamidieh | G01M 13/028 73/660 |
| 2005/0284225 A1* | 12/2005 | Luo | F16H 57/01 73/593 |
| 2008/0234964 A1 | 9/2008 | Miyasaka et al. | |
| 2010/0256932 A1* | 10/2010 | Kar | G01M 13/021 702/56 |
| 2013/0006540 A1* | 1/2013 | Sakaguchi | F03D 80/70 702/34 |
| 2013/0167624 A1 | 7/2013 | Shoda | |
| 2013/0180319 A1* | 7/2013 | Klein-Hitpass | G01M 13/028 73/54.02 |
| 2015/0116131 A1* | 4/2015 | Ikeda | F03D 17/00 340/870.07 |
| 2015/0330867 A1* | 11/2015 | Potts | F16H 57/01 73/593 |
| 2015/0369699 A1* | 12/2015 | Chen | G01M 13/028 73/593 |
| 2016/0215764 A1* | 7/2016 | Sakaguchi | G01M 5/0033 |
| 2017/0130700 A1* | 5/2017 | Sakaguchi | F03D 7/04 |

FOREIGN PATENT DOCUMENTS

| | | |
|---|---|---|
| CN | 104215453 | 12/2014 |
| CN | 103185670 | 9/2015 |
| JP | 2-222818 | 9/1990 |
| JP | 2-240536 | 9/1990 |
| JP | 8-43257 | 2/1996 |
| JP | 8-338790 | 12/1996 |
| JP | 2001-242009 | 9/2001 |
| JP | 2006-234785 | 9/2006 |
| JP | 2010-208850 | 9/2010 |

OTHER PUBLICATIONS

Chinese Office Action dated Nov. 5, 2019 in corresponding Chinese Patent Application No. 201780021582.3.
International Search Report dated Jun. 20, 2017 in corresponding International Patent Application No. PCT/JP2017/012149.
English Translation by WIPO of the International Preliminary Report on Patentability dated Oct. 11, 2018 in corresponding International Patent Application No. PCT/JP2017/012149, 8 pgs.
Chinese Office Action dated Aug. 13, 2020, in corresponding Chinese Patent Application No. 201780021582.3.

* cited by examiner

STATE MONITORING SYSTEM OF GEAR DEVICE AND STATE MONITORING METHOD

CROSS REFERENCE TO THE RELATED APPLICATION

This application is a continuation application, under 35 U.S.C. § 111(a), of international application No. PCT/JP2017/012149, filed Mar. 24, 2017, which claims priority to Japanese patent application Nos. 2016-068285, 2016-068286, and 2016-068287, each filed Mar. 30, 2016, the disclosure of which are incorporated by reference in their entirety into this application.

BACKGROUND OF THE INVENTION

Field of the Invention

The present invention relates to a state monitoring system that monitors a state of a gear device by using a plurality of sensors in, for example, a wind power generator or a large-scale plant.

Description of Related Art

To date, a state of a rotary component has been monitored, in a wind power generator, a large-scale plant, and the like, by measuring physical quantities using various sensors. In particular, in a state monitoring system of a rotary machine, a rotational frequency and a frequency of vibration caused by abnormality of a rotary component are determined and monitored according to design specifications of a bearing and a gear which are rotary components, thereby diagnosing abnormality for each component.

For example, technology in which, when a component that has caused abnormality can be determined as a rolling bearing, focus is placed on only a frequency, due to the abnormality, which can be calculated according to design specifications of the bearing, is suggested (see, for example, Patent Document 1). Also in the case of a gear, technology in which focus is placed on a frequency, due to meshing, which can be calculated according to design specifications of the gear, to estimate an abnormal state of the gear, is suggested (see, for example, Patent Document 2).

RELATED DOCUMENT

Patent Document

[Patent Document 1] JP Laid-open Patent Publication No. 2006-234785

[Patent Document 2] JP Laid-open Patent Publication No. H02-240536

SUMMARY OF THE INVENTION

However, in general, since manufacturers of rotary machines do not make the design specifications public, the characteristic frequency of vibration as described above cannot be determined. Therefore, the abnormality is often determined as having occurred in a case where, when various feature values such as an effective value and a maximum value of data are calculated, a greater change is found as compared to a normal state. In this case, since an abnormal portion cannot be determined and an abnormal state cannot be estimated, adjustment of maintenance time and inspection for the cause of the abnormality are made difficult.

When an object including a gear of which design specifications are unknown is monitored for its state, abnormality of the gear cannot be sufficiently diagnosed according to feature values such as an effective value and a maximum value of data. Technology in which a frequency caused by the gear is determined according to data of a normal value is required for more specifically performing diagnosis.

An object of the present invention is to provide a state monitoring device and a state monitoring method that can determine a meshing frequency or the number of teeth which is useful for diagnosing abnormality of a gear, in a gear device having a plurality of gear pairs of which gear design specifications are unknown.

A state monitoring system of the present invention is directed to a state monitoring system for monitoring a state of a gear device including a plurality of gear pairs, and the state monitoring system includes a meshing frequency determination device configured to determine a meshing frequency of the plurality of gear pairs in one or both of a speed increaser and a speed reducer each of which is the gear device.

The meshing frequency determination device includes
a sensor configured to detect a meshing vibration occurring in each gear pair,
a harmonic region setting unit configured to perform setting of an upper limit of a multiple of an estimated frequency of the meshing frequency to be inspected as a harmonic region,
an inspection frequency range setting unit in which a plurality of estimated frequency ranges to be inspected for the meshing frequency are set,
a maximum-peak-amplitude calculation unit configured to calculate a maximum peak amplitude from the meshing vibration detected by the sensor, in the estimated frequency ranges set by the inspection frequency range setting unit and in the harmonic region set by the harmonic region setting unit, and configured to select such estimated frequencies that a difference in the maximum peak amplitude between the plurality of estimated frequency ranges, is less than or equal to a predetermined multiple, and
a meshing frequency determination unit configured to determine an estimated frequency having a total value of maximum peak amplitudes calculated in the plurality of estimated frequency ranges, within a predetermined time, being k-th (k is a natural number) greatest among the estimated frequencies selected by the maximum-peak-amplitude calculation unit, as a meshing frequency of a gear pair having the k-th highest tooth surface speed.

The predetermined multiple and the predetermined time are a multiple and a time, respectively, which are optionally determined by designing or the like. For example, appropriate multiple and time are obtained and determined according to one or both of a test and a simulation (the same applies to a state monitoring method for a gear device which is described below).

In this configuration, the harmonic region setting unit performs setting of an upper limit of a multiple of an estimated frequency of the meshing frequency to be inspected as a harmonic region. For example, the harmonic region is set based on up to what multiple of the estimated frequency often occurs as a harmonic due to meshing vibration of a normal gear pair. The inspection frequency range setting unit sets a plurality of estimated frequency ranges which are to be inspected for a meshing frequency.

The maximum-peak-amplitude calculation unit calculates a maximum peak amplitude from meshing vibration detected by the sensor, in the estimated frequency ranges, and the harmonic region having been set. Furthermore, the maximum-peak-amplitude calculation unit selects such estimated frequencies that a difference in the maximum peak amplitude between a plurality of estimated frequency ranges, is less than or equal to a predetermined multiple. Such estimated frequencies that a difference in the maximum peak amplitude between the adjacent ranges is less than or equal to a predetermined multiple are selected, whereby discrimination between a self-induced vibration of an actual machine and a forced vibration such as a meshing frequency can be made. The meshing frequency determination unit determines an estimated frequency having a total value of maximum peak amplitudes calculated in the plurality of estimated frequency ranges, within a predetermined time, being k-th (k is a natural number) greatest among the estimated frequencies selected as discussed above, as a meshing frequency of a gear pair having the k-th highest tooth surface speed. The meshing frequency determination unit uses such a phenomenon that the higher the tooth surface speed is, the higher meshing vibration is, in a normal gear pair. Therefore, the meshing frequency, of each gear pair, which is useful for gear abnormality diagnosis can be determined.

The state monitoring system of the present invention may include a teeth number determination device configured to determine the number of teeth of a single-pinion type planetary gear device having one or both of a speed increaser and a speed reducer each of which has a plurality of gear pairs and each of which is the gear device.

The teeth number determination device may include
the meshing frequency determination device, and
a planetary gear teeth number determination unit configured to determine the number of teeth, of the planetary gear device, with which a speed ratio is maximum, from the meshing frequency determined by the meshing frequency determination unit, by using a predetermined teeth number conditional expression for a planetary gear mechanism.

The planetary gear teeth number determination unit determines the number of teeth, of the planetary gear device, with which a speed ratio becomes maximum, by using a predetermined teeth number conditional expression for a planetary gear mechanism, from the determined meshing frequency. Therefore, a frequency useful for gear abnormality diagnosis can be calculated.

In the state monitoring system, the teeth number determination device may be a teeth number determination device configured to determine the number of teeth of a speed increaser for a wind turbine including a planetary single-pinion type planetary gear device having one gear pair and a two-stage parallel shaft gear device having two gear pairs.

the meshing frequency determination unit may be configured to:
determine an estimated frequency having total value of the maximum peak amplitudes calculated in the plurality of estimated frequency ranges, within the predetermined time, being the greatest, as a parallel-shaft-gear intermediate-high speed shaft meshing frequency in the two-stage parallel shaft gear device;
determine an estimated frequency having the total value being the second greatest, as a parallel-shaft-gear low-intermediate speed shaft meshing frequency in the two-stage parallel shaft gear device; and
determine an estimated frequency having the total value being the third greatest, as a planetary gear meshing frequency in the planetary gear device.

The teeth number determination device may further include a two-stage-parallel-shaft-gear teeth number determination unit configured to determine the numbers of teeth, of the two-stage parallel shaft gear device, with which a difference in speed ratios between the two gear pairs is less than or equal to 1.5, by using the parallel-shaft-gear intermediate-high speed shaft meshing frequency and the parallel-shaft-gear low-intermediate speed shaft meshing frequency both determined by the meshing frequency determination unit, and a speed increasing ratio of the planetary gear device calculated from the number of teeth determined by the planetary gear teeth number determination unit.

The meshing frequency determination unit 45 determines an estimated frequency having total value of the maximum peak amplitudes calculated in the plurality of estimated frequency ranges, within the predetermined time, being the greatest, as a parallel-shaft-gear intermediate-high speed shaft meshing frequency in the two-stage parallel shaft gear device; determines an estimated frequency having the total value being the second greatest, as a parallel-shaft-gear low-intermediate speed shaft meshing frequency in the two-stage parallel shaft gear device 16; and determines an estimated frequency having the total value being the third greatest, as a planetary gear meshing frequency in the planetary gear device. As described above, the meshing frequency determination unit 45 uses such a phenomenon that the higher the tooth surface speed is, the higher meshing vibration is, in a normal gear pair. Therefore, the meshing frequency, of each gear pair, which is useful for gear abnormality diagnosis can be determined. The two-stage-parallel-shaft-gear teeth number determination unit 47 determines the numbers of teeth, of the two-stage parallel shaft gear device, with which a difference in speed ratios between the two gear pairs is less than or equal to 1.5, by using the parallel-shaft-gear intermediate-high speed shaft meshing frequency and the parallel-shaft-gear low-intermediate speed shaft meshing frequency both determined by the meshing frequency determination unit, and a speed increasing ratio of the planetary gear device calculated from the number of teeth determined by the planetary gear teeth number determination unit. The two-stage-parallel-shaft-gear teeth number determination unit sets the difference in the speed ratio between the gear pairs to be less than or equal to 1.5 in order to prevent uneven wear of the tooth surfaces of the two gear pairs. Therefore, the number of teeth, of the gear of the speed increaser for a wind turbine, which is useful for gear abnormality diagnosis can be determined.

The harmonic region setting unit may perform setting so as to determine whether or not a harmonic region up to three times an estimated frequency of the meshing frequency is to be inspected. This is because a harmonic up to three times the estimated frequency often occurs due to meshing vibration of a normal gear pair.

The state monitoring system of the present invention may include a mesh frequency determination device for any of the gear pairs, and may include a monitoring unit configured to monitor occurrence of one or both of: increase and reduction of a harmonic component; and a side band, based on the determined meshing frequency. In this configuration, the meshing frequency is known, and, for example, the monitoring unit monitors occurrence of: increase and reduction of a harmonic component; or a side band, whereby an accurate state monitoring such as calculation of an amount of wear on a tooth surface or a gear abnormality state can be performed.

A gear pair meshing frequency determining method of the present invention is a method for monitoring a state of a gear device having a plurality of gear pairs, and including a meshing frequency determining process of determining a meshing frequency of each of the plurality of gear pairs in one or both of a speed increaser and a speed reducer each of which is the gear device.

The meshing frequency determining process includes
a step of detecting a meshing vibration occurring in each gear pair using a sensor,
a harmonic region setting step of performing setting an upper limit of a multiple of an estimated frequency of the meshing frequency to be inspected as a harmonic region,
an inspection frequency range setting step of setting a plurality of estimated frequency ranges to be inspected for the meshing frequency,
a maximum-peak-amplitude calculation step of calculating a maximum peak amplitude from the meshing vibration detected by the sensor, in the estimated frequency ranges set by the inspection frequency range setting step and in the harmonic region set by the harmonic region setting step, and configured to select such estimated frequencies that a difference in the maximum peak amplitude between the plurality of estimated frequency ranges, is less than or equal to a predetermined multiple, and
a meshing frequency determining step of determining an estimated frequency having a total value of maximum peak amplitudes calculated in the plurality of estimated frequency ranges, within a predetermined time, being k-th (k is a natural number) greatest among the estimated frequencies selected by the maximum-peak-amplitude calculation step, as a meshing frequency of a gear pair having the k-th highest tooth surface speed.

In this configuration, in the harmonic region setting step, setting is performed for an upper limit of a multiple of an estimated frequency of the meshing frequency to be inspected as a harmonic region. For example, the harmonic region is set based on up to what multiple of the estimated frequency often occurs as a harmonic due to meshing vibration of a normal gear pair. In the inspection frequency range setting step, a plurality of estimated frequency ranges which are to be inspected for a meshing frequency are set.

In the maximum-peak-amplitude calculation step, a maximum peak amplitude is calculated from the meshing vibration detected by the sensor, in the estimated frequency ranges and in the harmonic region, set as discussed above. Furthermore, in the maximum-peak-amplitude calculation step, such estimated frequencies that a difference in the maximum peak amplitude between the plurality of estimated frequency ranges, is less than or equal to a predetermined multiple, are selected. Such estimated frequencies that a difference in the maximum peak amplitude is less than or equal to a predetermined multiple are selected, whereby discrimination between a self-induced vibration of an actual machine and a forced vibration such as a meshing frequency can be made.

In the meshing frequency determining step, an estimated frequency having a total value of maximum peak amplitudes calculated in the plurality of estimated frequency ranges, within a predetermined time, being k-th (k is a natural number) greatest among the estimated frequencies selected by the maximum-peak-amplitude calculation step, is determined as a meshing frequency of a gear pair having the k-th highest tooth surface speed. In the meshing frequency determining step, such a phenomenon that the higher the tooth surface speed is, the higher meshing vibration is, in a normal gear pair, is used. Therefore, the meshing frequency, of each gear pair, which is useful for gear abnormality diagnosis can be determined.

The state monitoring method of the present invention may include a teeth number determining process of determining the number of teeth of a single-pinion type planetary gear device having one or both of a speed increaser and a speed reducer each of which has a plurality of gear pairs and each of which is the gear device.

The teeth number determining process may include
the meshing frequency determining process, and
a planetary gear teeth number determining step of determining the number of teeth, of the planetary gear device, with which a speed ratio is maximum, from the meshing frequency determined by the meshing frequency determining process, by using a predetermined teeth number conditional expression for a planetary gear mechanism.

In the planetary gear teeth number determining step, the number of teeth, of the planetary gear device, with which a speed ratio becomes maximum is determined by using the teeth number conditional expression from the determined meshing frequency. Therefore, a frequency useful for gear abnormality diagnosis can be calculated.

In the state monitoring method of the present invention, the teeth number determining process may be a process of determining the number of teeth of a speed increaser for a wind turbine including a planetary single-pinion type planetary gear device having one gear pair and a two-stage parallel shaft gear device having two gear pairs.

The meshing frequency determining process may include:
determining an estimated frequency having total value of the maximum peak amplitudes calculated in the plurality of estimated frequency ranges, within the predetermined time, being the greatest, as a parallel-shaft-gear intermediate-high speed shaft meshing frequency in the two-stage parallel shaft gear device;
determining an estimated frequency having the total value being the second greatest, as a parallel-shaft-gear low-intermediate speed shaft meshing frequency in the two-stage parallel shaft gear device; and
determining an estimated frequency having the total value being the third greatest, as a planetary gear meshing frequency in the planetary gear device.

The teeth number determining process may further include
a two-stage-parallel-shaft-gear teeth number determining step of determining the numbers of teeth, of the two-stage parallel shaft gear device, with which a difference in speed ratios between the two gear pairs is less than or equal to 1.5, by using the parallel-shaft-gear intermediate-high speed shaft meshing frequency and the parallel-shaft-gear low-intermediate speed shaft meshing frequency both determined by the meshing frequency determining process, and a speed increasing ratio of the planetary gear device calculated from the number of teeth determined by the planetary gear teeth number determining step.

In the meshing frequency determining step, such an estimated frequency that the total value of the maximum peak amplitudes calculated in the plurality of estimated frequency ranges, within a predetermined time, is greatest, is determined as a parallel-shaft-gear intermediate-high speed shaft meshing frequency by the two-stage parallel shaft gear device. Such an estimated frequency that the total value is the second greatest is determined as the parallel-shaft-gear low-intermediate speed shaft meshing frequency by the two-stage parallel shaft gear device. Such an estimated frequency that the total value is the third greatest is determined as the planetary gear meshing frequency by the planetary gear device. As described above, in the meshing frequency determining step, such a phenomenon that the higher the tooth surface speed is, the higher meshing vibration is, in a normal gear pair, is used. In the two-stage-parallel-shaft-gear teeth number determining step, the numbers of teeth, of the two-stage parallel shaft gear device, with which a difference in speed ratio between the two gear pairs is less than or equal to 1.5, is determined by using the parallel-shaft-gear intermediate-high speed shaft meshing frequency and the parallel-shaft-gear low-intermediate speed shaft meshing frequency, and a speed increasing ratio, of the planetary gear device, which can be calculated from the number of teeth determined in the planetary gear teeth number determining step. Therefore, the number of teeth, of the gear of the speed increaser for a wind turbine, which is useful for gear abnormality diagnosis can be determined.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
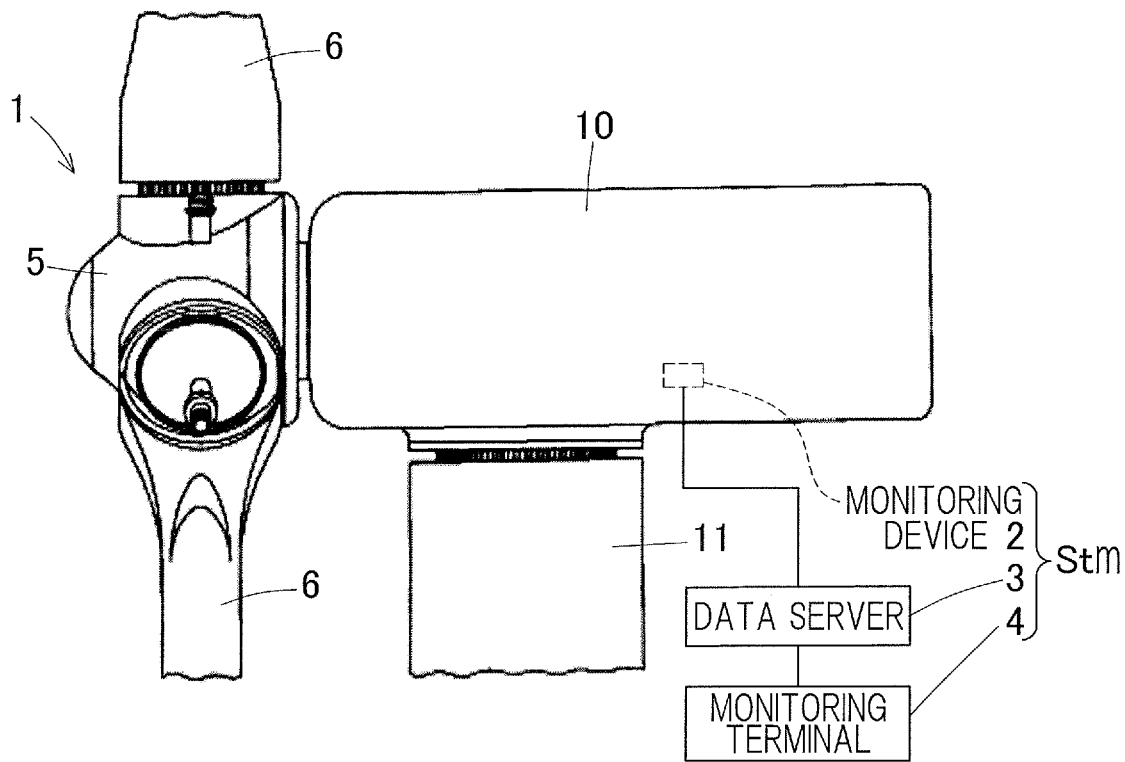
FIG. 1 schematically illustrates the entire configuration of a state monitoring system according to one embodiment of the present invention.

A state monitoring system according to one embodiment of the present invention will be described with reference to FIG. 1 to FIG. 8. As shown in FIG. 1, a state monitoring system Stm is a system that monitors a state of a gear device such as a speed increaser in a wind power generator (hereinafter, may be simply referred to as "wind turbine") 1, and includes a monitoring device 2, a data server 3, and a monitoring terminal 4. The monitoring device 2 has a plurality of sensors Sa, Sb (FIG. 3), and has a function of calculating necessary measurement data from detected values by the sensors Sa, Sb (FIG. 3) and transmitting the data to the data server 3. The data server 3 and the monitoring terminal 4 are connected to each other by, for example, a corporate LAN (LAN: Local Area Network). The measurement data received by the data server 3 is outputted by the monitoring terminal 4 described below. The monitoring terminal 4 displays specific analysis of the measurement data, change of setting of the monitoring device 2, and a state of each device in the wind power generator 1.

Figure 2:
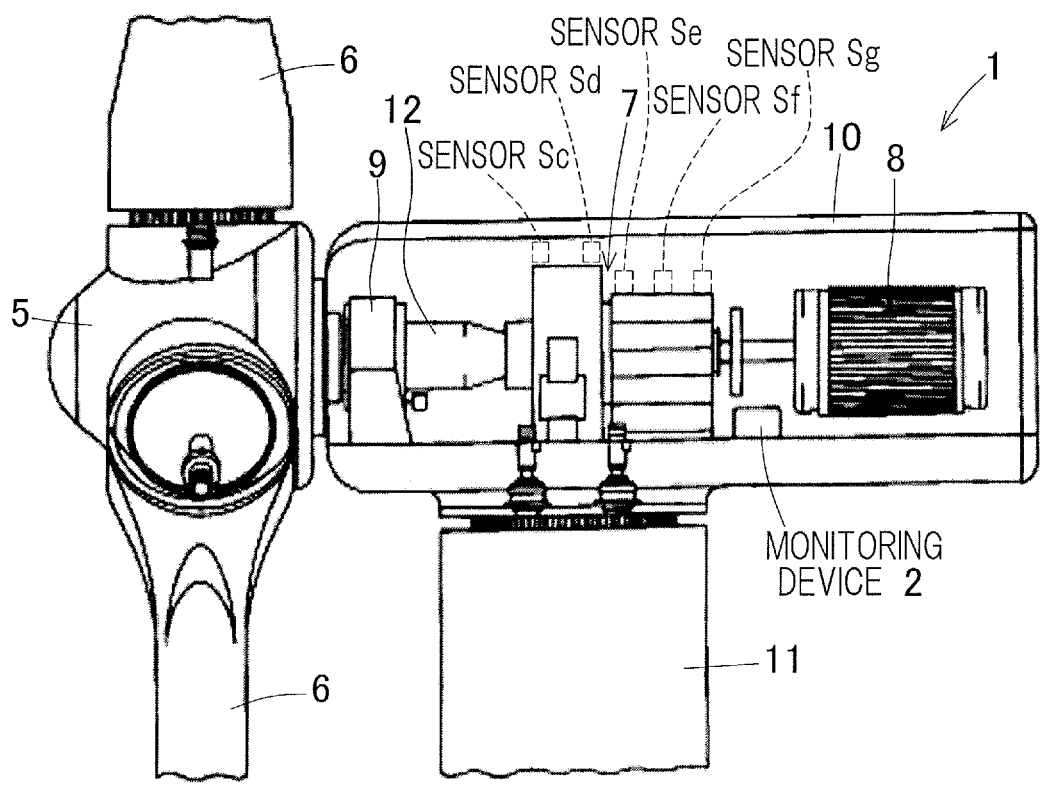
FIG. 2 schematically illustrates a wind power generator to be monitored by the state monitoring system.

The wind power generator 1 will be described. As shown in FIG. 2, the wind power generator 1 includes a main shaft 5, a blade 6, a speed increaser 7 which is a gear device, a generator 8, and a main bearing 9. The wind power generator 1 includes the plurality of sensors Sa, Sb (FIG. 3) and the monitoring device 2. The speed increaser 7, the generator 8, the main bearing 9, the plurality of sensors Sa, Sb (FIG. 3), and the monitoring device 2 are accommodated in a nacelle 10, and the nacelle 10 is supported by a tower 11. The main shaft 5 is connected to an input shaft of the speed increaser 7, and rotatably supported by the main bearing 9. The blade 6 is disposed at the leading end of a main shaft 12, and receives wind. The main shaft 12 transmits rotational torque generated by the blade 6 that has received wind, to the input shaft of the speed increaser 7. The main bearing 9 is implemented as a rolling bearing such as a self-aligning roller bearing, a tapered roller bearing, a cylindrical roller bearing, and a ball bearing.

Figure 3:
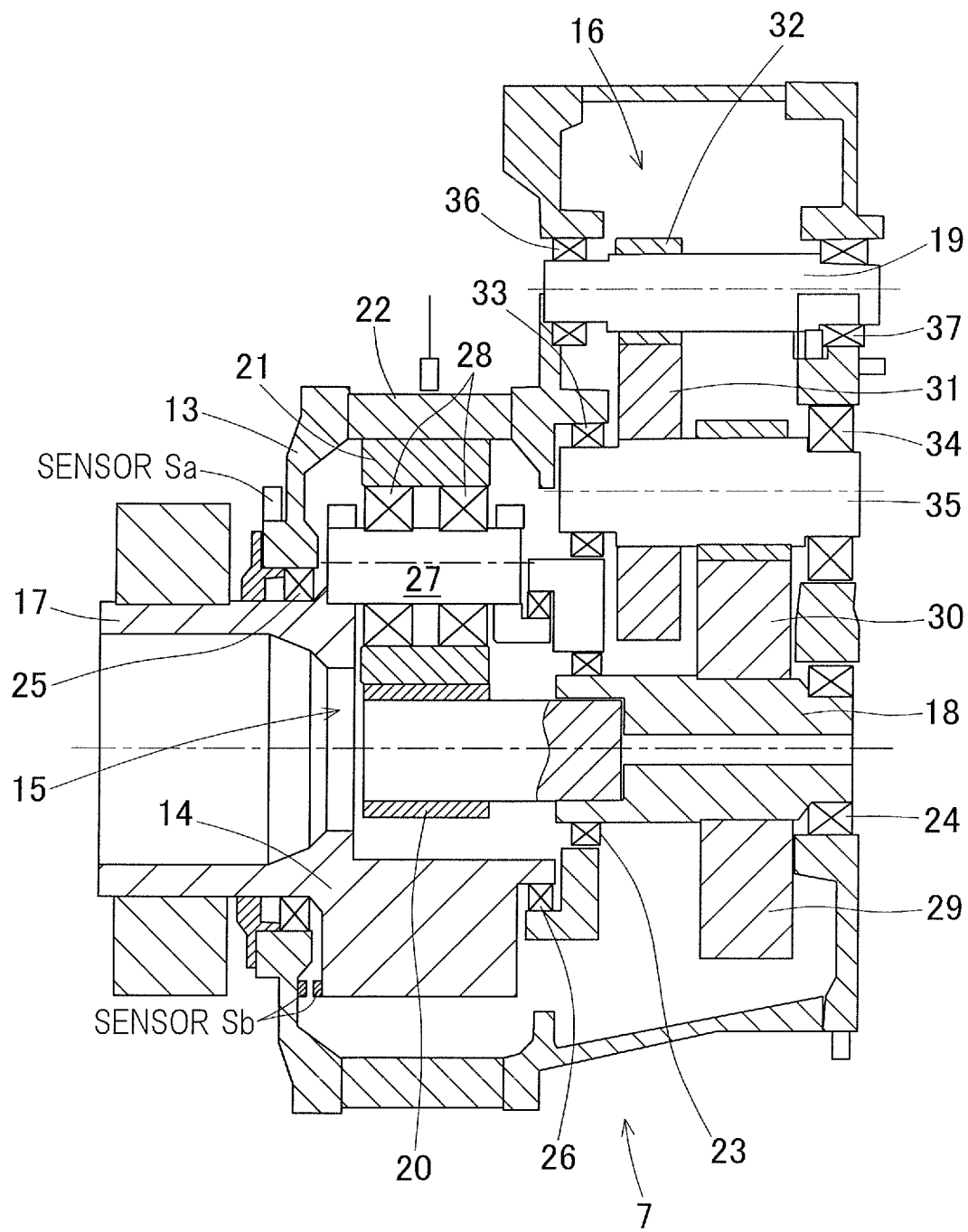
FIG. 3 is a cross-sectional view of a speed increaser of the wind power generator.

As shown in FIG. 3, two kinds of sensors, that is, an acceleration sensor Sa and a rotation speed sensor Sb are disposed as the plurality of sensors Sa, Sb. The acceleration sensor Sa is fixed to a casing 13 of the speed increaser 7. The acceleration sensor Sa detects meshing vibration generated from each gear pair. The rotation speed sensor Sb measures a rotation speed (main shaft rotation speed) of a carrier 14 described below.

As shown in FIG. 2, the speed increaser 7 is disposed between the main shaft 12 and the generator 8. The speed increaser 7 increases a rotation speed of the main shaft 12 for output to the generator 8. The generator 8 is connected to an output shaft (high speed shaft) of the speed increaser 7, and generates power by the rotational torque received from the speed increaser 7. As the generator 8, for example, an induction generator is used.

As shown in FIG. 3, the speed increaser 7 for a wind turbine includes a planetary single-pinion type planetary gear device 15 including one gear pair, and a two-stage parallel shaft gear device 16 including two gear pairs. The planetary gear device 15 and the two-stage parallel shaft gear device 16 are disposed in the same casing 13. The planetary gear device 15 increases rotation speed of an input shaft 17, and transmits the rotation to a low speed shaft 18. The low speed shaft 18 is disposed so as to be concentric with the input shaft 17. The two-stage parallel shaft gear device 16 further increases rotation speed of the low speed shaft 18 and transmits the rotation to a high speed shaft 19 that is an output shaft.

The planetary gear device 15 includes a sun gear 20, planetary gears 21, and an internal gear 22. Each planetary gear 21 meshes with the sun gear 20 and the internal gear 22. The internal gear 22 is disposed on the inner circumferential surface of the casing 13. The low speed shaft 18 is rotatably supported by the low speed bearings 23 and 24. The sun gear 20 is fixed to the outer circumferential surface of the low speed shaft 18.

The planetary gears 21 are supported by the carrier 14. The carrier 14 is an input portion of the planetary gear device 15, and is disposed integrally and concentrically with the input shaft 17. The carrier 14 is supported by the casing 13 via planetary carrier bearings 25 and 26 so as to turn. The planetary carrier bearing 25 is disposed on the rotor side in the casing 13, and the planetary carrier bearing 26 is disposed on the generator side in the casing 13. The carrier 14 has a plurality of planetary shafts 27 spaced at regular intervals around the circumference. The planetary gears 21 are rotatably supported by the planetary shafts 27 via planetary bearings 28.

The two-stage parallel shaft gear device 16 includes a low-speed-shaft large gear 29 and an intermediate-speed-shaft small gear 30 of a first gear pair, and an intermediate-speed-shaft large gear 31 and a high-speed-shaft small gear 32 of a second gear pair. The low-speed-shaft large gear 29 is fixed to the outer circumference of the low speed shaft 18. In the casing 13, bearings 33 and 34 are supported in a portion radially outward of the low speed shaft 18, and an intermediate speed shaft 35 is rotatably supported via the bearings 33 and 34. The intermediate-speed-shaft small gear 30 is fixed to the outer circumference of the intermediate speed shaft 35, and the intermediate-speed-shaft small gear 30 and the low-speed-shaft large gear 29 are disposed so as to mesh with each other.

In the casing 13, the high speed shaft 19 is disposed in a portion radially outward of the intermediate speed shaft 35. The high speed shaft 19 is rotatably supported via bearings 36 and 37 supported in the casing 13. The high speed shaft 19, the intermediate speed shaft 35, and the low speed shaft 18 are disposed so as to be parallel to the input shaft 17. The intermediate-speed-shaft large gear 31 is fixed to the outer circumference of the intermediate speed shaft 35. The intermediate-speed-shaft large gear 31 meshes with the high-speed-shaft small gear 32 fixed to the outer circumference of the high speed shaft 19. The lower portion of the casing 13 forms an oil bath of lubricating oil.

As shown in FIG. 2 and FIG. 3, when the blade 6 receives wind and the input shaft 17 rotates, the carrier 14 turns. Thus, the planetary gears 21 revolve. Each planetary gear 21 revolves while meshing with the internal gear 22, and thus rotates. The planetary gear 21 that rotates while revolving meshes with the sun gear 20, so that the speed of the sun gear 20 is increased and the sun gear 20 rotates relative to the input shaft 17. The speed of rotation of the sun gear 20 is further increased by the two-stage parallel shaft gear device 16, and the rotation is transmitted to the high speed shaft 19 that is the output shaft. A high speed rotation that enables power generation can be obtained by the high speed shaft 19.

Figure 4:
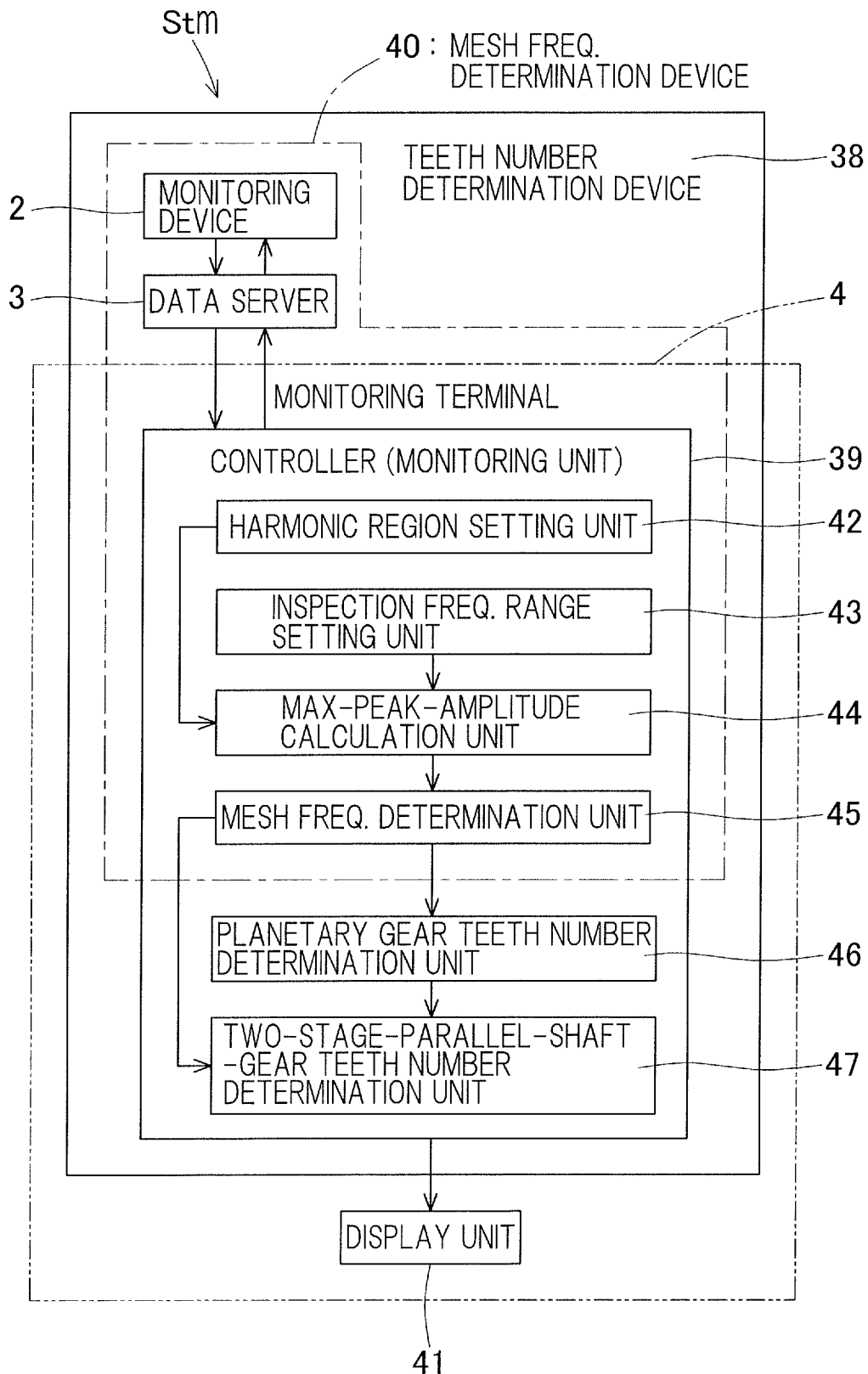
FIG. 4 is a block diagram illustrating a control system of the state monitoring system.

FIG. 4 is a block diagram illustrating a control system of the state monitoring system Stm. The state monitoring system Stm includes a teeth number determination device 38 for determining the number of teeth of the speed increaser 7 (FIG. 2). The teeth number determination device 38 includes the monitoring device 2, the data server 3, and a controller 39 of the monitoring terminal 4. The teeth number determination device 38 includes a meshing frequency determination device 40. The meshing frequency determination device 40 determines a meshing frequency of each of a plurality (three in this example) of gear pairs. The following description also includes description of a teeth number determining method for determining the number of teeth of the speed increaser 7 (FIG. 2), and description of a meshing frequency determining method for determining a meshing frequency of the gear pair.

The monitoring terminal 4 includes the controller 39 that is a monitoring unit, and a display unit 41. The controller 39 includes a computer such as a microcomputer and a program executed by the computer, and an electronic circuit and the like. The controller 39 includes a harmonic region setting unit 42, an inspection frequency range setting unit 43, a maximum-peak-amplitude calculation unit 44, a meshing frequency determination unit 45, a planetary gear teeth number determination unit 46, and a two-stage-parallel-shaft-gear teeth number determination unit 47.

The harmonic region setting unit 42 performs setting of an upper limit of a multiple of an estimated frequency of a meshing frequency of each gear pair of the speed increaser 7 (FIG. 3) to be inspected as a harmonic region. In this example, setting is performed so as to determine whether or not the harmonic region up to three times an estimated frequency of a meshing frequency is to be inspected. This is because a harmonic up to three times the estimated frequency often occurs due to meshing vibration of a normal gear pair.

The inspection frequency range setting unit 43 sets a plurality of estimated frequency ranges which are to be inspected for a meshing frequency. The estimated frequency ranges to be inspected are as follows.

Range (1) estimated frequency±½ of rotational frequency

Range (2) estimated frequency×2±½ of rotational frequency

Range (3) estimated frequency×3±½ of rotational frequency

The ranges (1) to (3) are set as a set of inspection frequency ranges. A rotational frequency of a lower-speed gear is preferably used in order to prevent influence of a side band.

The maximum-peak-amplitude calculation unit 44 calculates a maximum peak amplitude from meshing vibration detected by a predetermined acceleration sensor Sa (FIG. 3), in the estimated frequency ranges as described above, and the harmonic region having been set as described above. The maximum-peak-amplitude calculation unit 44 calculates the maximum peak amplitude in each of the ranges (1) to (3), and selects such estimated frequencies that a difference in the maximum peak amplitude between a plurality of estimated frequency ranges, is less than or equal to a predetermined multiple.

Specifically, the maximum-peak-amplitude calculation unit 44 selects such estimated frequencies that a difference in the maximum peak amplitude between the range (1) and the range (2) is less than or equal to ten times, and a difference in the maximum peak amplitude between the range (2) and the range (3) is less than or equal to ten times. Thus, comparison between the maximum peak amplitudes of the estimated frequency and the harmonic up to at least three times the estimated frequency is performed, and such estimated frequencies that a difference in the maximum peak amplitude between the adjacent ranges is less than or equal to ten times are selected, whereby discrimination between a self-induced vibration of an actual machine and a forced vibration such as a meshing frequency can be made.

The meshing frequency determination unit 45 determines an estimated frequency having a total value of maximum peak amplitudes calculated in the plurality of estimated frequency ranges, within a predetermined time, being k-th (k is a natural number) greatest among the estimated frequencies selected as described above, as a meshing frequency of a gear pair having the k-th highest tooth surface speed.

Specifically, the meshing frequency determination unit 45 determines an estimated frequency having total value of the maximum peak amplitudes calculated in the plurality of estimated frequency ranges, within a predetermined time (in this example, for 10 seconds), being greatest among the estimated frequencies selected by the maximum-peak-amplitude calculation unit 44, as a parallel-shaft-gear intermediate-high speed shaft meshing frequency by the two-stage parallel shaft gear device 16 (FIG. 3).

The meshing frequency determination unit 45 determines an estimated frequency having total value being the second greatest, as the parallel-shaft-gear low-intermediate speed shaft meshing frequency in the two-stage parallel shaft gear device 16 (FIG. 3). The meshing frequency determination unit 45 determines an estimated frequency having total value being the third greatest, as the planetary gear meshing frequency in the planetary gear device 15 (FIG. 3).

When the gear is normal, a meshing vibration waveform is close to a sinewave, and the peak amplitude at the frequency corresponds to the meshing frequency. However, in the case of an actual machine, the sinewave is distorted into a rectangular waveform due to an error in mounting the gears and eccentricity of the gears, and a peak amplitude at a higher-order meshing frequency occurs. The meshing frequency determination unit 45 uses such a phenomenon, inspects for a frequency at which harmonic occurs, and can determine a meshing frequency based on the FFT analysis result. Furthermore, the meshing frequency determination unit 45 uses such a phenomenon that the higher the tooth surface speed is, the higher meshing vibration is, in a normal gear pair. The meshing frequency determination device 45 includes the harmonic region setting unit 42, the inspection frequency range setting unit 43, the maximum-peak-amplitude calculation unit 44, and the meshing frequency determination unit 45 in the controller 39.

The planetary gear teeth number determination unit 46 determines the number of teeth, of the planetary gear device 15 (FIG. 3), with which a speed ratio becomes maximum, by using a predetermined teeth number conditional expression for a planetary gear mechanism, from the determined planetary gear meshing frequency. The teeth number calculation expression using the planetary gear meshing frequency and the teeth number conditional expression for the planetary gear mechanism are as follows.

As shown in FIG. 3 and FIG. 4, np represents a carrier rotation speed of the planetary gear device 15, GMFp represents a planetary gear meshing frequency, Zr represents the number of teeth of the internal gear 22, Zp represents the number of teeth of the planetary gear 21, and Zs represents the number of teeth of the sun gear 20. The number of the planetary gears is represented as N, and is known in the present embodiment. In order to prevent a cutting phenomenon in which a part of a tooth profile curve of a tooth root of the gear is cut by an edge straight portion of a tool, the number of teeth is greater than "17" for all the gears.

Expression for calculating the number of teeth of the internal gear 22 by using a planetary gear meshing frequency $$Zr=GMFp/np \hspace{2cm} \text{Expression (1)}$$

Coaxial state condition: condition to be satisfied in order to make the internal gear 22, the planetary gear 21, and the sun gear 20 coaxial with each other $$Zr=Zs+2Zp \hspace{2cm} \text{Expression (2)}$$

Adjacency condition: condition to be satisfied in order to prevent the planetary gears from interfering with each other due to striking $$Zp+2<(Zr-Zp)\sin(180°/N) \hspace{2cm} \text{Expression (3)}$$

Assembly condition: condition to be satisfied in order to dispose the planetary gears 21 at regular intervals $$\text{Integer}=(Zr+Zs)/N \hspace{2cm} \text{Expression (4)}$$

Interference prevention: condition to be satisfied in order to prevent the tooth root of the planetary gear 21 and the tooth tip of the internal gear 22 from interfering with each other $$Zp>19 \hspace{2cm} \text{Expression (5)}$$

The planetary gear teeth number determination unit 46 calculates the number Zr of teeth of the internal gear 22 according to Expression (1) by using the planetary gear meshing frequency GMFp determined by the meshing frequency determination unit 45, and a carrier rotation speed (main shaft rotation speed) np obtained by the rotation speed sensor Sb. The planetary gear teeth number determination unit 46 restricts a possible range for the number Zp of teeth of the planetary gear 21, according to Expression (3) and Expression (5) by using the number Zr of teeth, of the internal gear 22, having been calculated.

The planetary gear teeth number determination unit 46 calculates a combination (Zp, Zs) of the number of teeth of the planetary gear 21 and the number of teeth of the sun gear 20, by using Expression (2), in the restricted range for the number Zp of teeth. Furthermore, the planetary gear teeth number determination unit 46 determines a combination, among the calculated combinations (Zp, Zs) of the numbers of teeth, which satisfies Expression (4) and has the greatest speed increasing ratio Zr/Zs+1. Therefore, the numbers (Zr, Zp, Zs) of teeth of the internal gear 22, the planetary gear 21, and the sun gear 20, respectively, of the planetary gear device 15 can be determined.

The two-stage-parallel-shaft-gear teeth number determination unit 47 determines the numbers of teeth, of the two-stage parallel shaft gear device 16, with which a difference in speed ratio between the two gear pairs is less than or equal to 1.5, by using the parallel-shaft-gear intermediate-high speed shaft meshing frequency and the parallel-shaft-gear low-intermediate speed shaft meshing frequency which have been determined by the meshing frequency determination unit 45, and a speed increasing ratio, of the planetary gear device 15, which can be calculated from the number of teeth determined by the planetary gear teeth number determination unit 46.

An expression for calculation with the parallel-shaft-gear intermediate-high speed shaft meshing frequency and the parallel-shaft-gear low-intermediate speed shaft meshing frequency which are used by the two-stage-parallel-shaft-gear teeth number determination unit 47, and an expression for calculating the teeth number ratio between intermediate-speed-shaft small gear and large gear by using a speed increasing ratio are as follows. GMFmh represents a parallel-shaft-gear intermediate-high speed shaft meshing frequency, GMFlm represents a parallel-shaft-gear low-intermediate speed shaft meshing frequency, Zlg represents the number of teeth of the low-speed-shaft large gear 29, Zmp represents the number of teeth of the intermediate-speed-shaft small gear 30, Zmg represents the number of teeth of the intermediate-speed-shaft large gear 31, and Zhp represents the number of teeth of the high-speed-shaft small gear 32. I represents the entire speed increasing ratio which is known. Ip represents a planetary gear speed increasing ratio Zr/Zs+1 by the planetary gear teeth number determination unit 46.

Expression for calculating the number of teeth of the high-speed-shaft small gear 32 by using the parallel-shaft-gear intermediate-high speed shaft meshing frequency $$Zhp = GMFmh/(np \times I) \qquad \text{Expression (6)}$$

Expression for calculating the number of teeth of the low-speed-shaft large gear 29 by using the parallel-shaft-gear low-intermediate speed shaft meshing frequency $$Zlg = GMFlm/(np \times Ip) \qquad \text{Expression (7)}$$

Expression for calculating a teeth number ratio between intermediate-speed-shaft small gear and large gear $$Zmg/Zmp = (I/Ip) \times (Zhp/Zlg) \qquad \text{Expression (8)}$$

The two-stage-parallel-shaft-gear teeth number determination unit 47 calculates Zhp and Zlg according to Expression (6) and Expression (7) by using GMFmh and GMFlm determined by the meshing frequency determination unit 45. The teeth number ratio Zmg/Zmp is calculated according to Expression (8) by using the calculated Zhp and Zlg. A combination (Zmg, Zmp) with which a difference between the speed ratios Zlg/Zmp and Zmg/Zhp of the gear pairs of the parallel shaft gear is less than or equal to 1.5 is determined, whereby Zlg, Zmg, Zmp, and Zhp can be determined. The two-stage-parallel-shaft-gear teeth number determination unit 47 sets the difference in the speed ratio between the gear pairs to be less than or equal to 1.5 in order to prevent uneven wear of the tooth surfaces of the two gear pairs.

Figure 5:
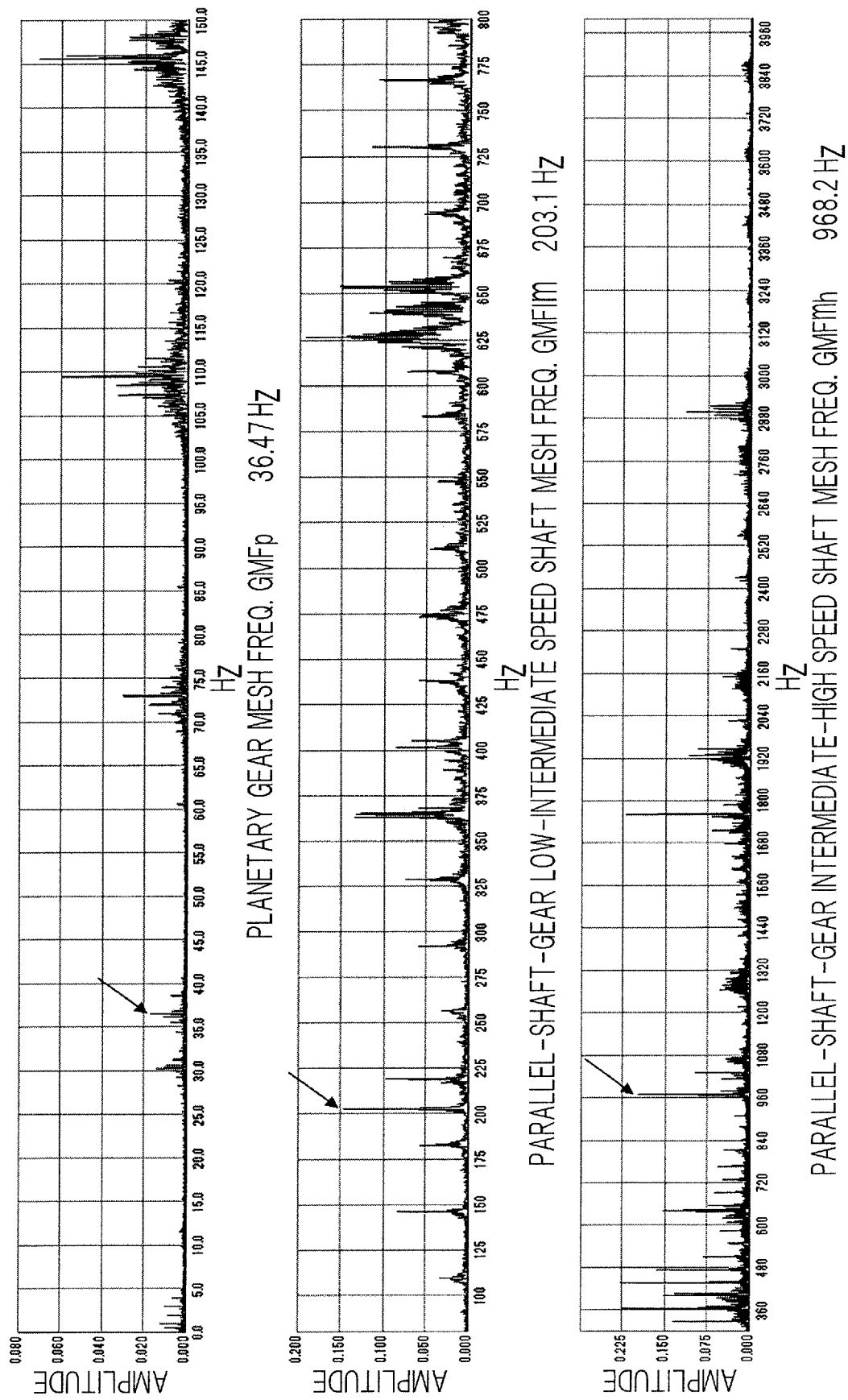
FIG. 5 illustrates a meshing frequency, of each gear pair, determined by the meshing frequency determination unit of the state monitoring system.

FIG. 5 illustrates a meshing frequency, of each gear pair, determined by the meshing frequency determination unit. As shown in FIG. 4 and FIG. 5, the controller 39 controls the display unit 41 so as to display the meshing frequency of each gear pair. The meshing frequency determination unit 45 can determine, for example, the planetary gear meshing frequency GMFp as 36.47 Hz, the parallel-shaft-gear low-intermediate speed shaft meshing frequency GMFlm as 203.1 Hz, and the parallel-shaft-gear intermediate-high speed shaft meshing frequency GMFmh as 968.2 Hz.

Figure 6:
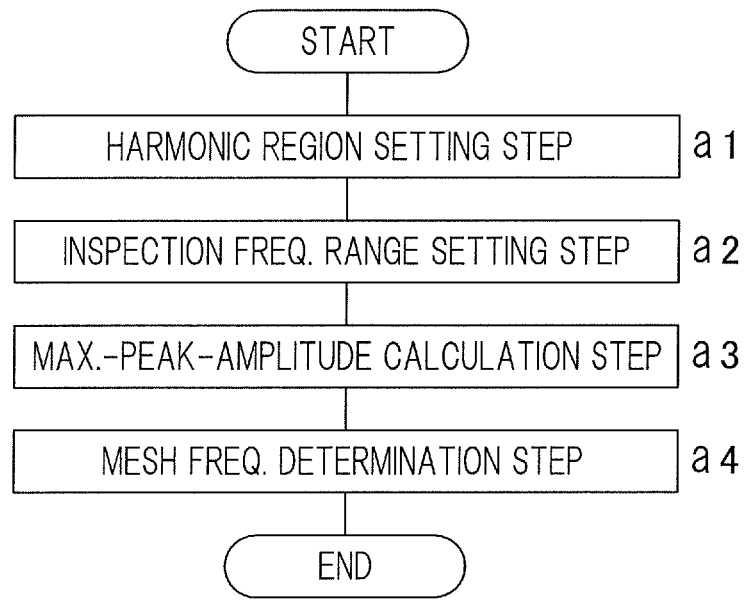
FIG. 6 is a flow chart showing a meshing frequency determining method performed by the meshing frequency determination unit.

A specific example of a meshing frequency determining algorithm will be described below. FIG. 6 is a flow chart showing a meshing frequency determining process, by the meshing frequency determination unit, which is included in the state monitoring method, for a gear device, according to the present embodiment. The following description will be made also with reference to FIG. 4 as appropriate. The meshing frequency determining process according to the present embodiment includes a harmonic region setting process step (step a1), an inspection frequency range setting process step (step a2), a maximum-peak-amplitude calculation process step (step a3), and a meshing frequency determining process step (step a4). The process steps described in order starting from the smallest step number are controlled by the harmonic region setting unit 42, the inspection frequency range setting unit 43, the maximum-peak-amplitude calculation unit 44, and the meshing frequency determination unit 45, respectively.

Step a1: After the start of the process, setting is performed so as to determine an upper limit of a multiple of an estimated frequency is to be inspected as a harmonic. In the present embodiment, a harmonic up to three times the estimated frequency is set to be inspected.

Step a2: An inspection frequency range is set. The inspection frequency range is as follows.

Range (1) estimated frequency±½ of rotational frequency

Range (2) estimated frequency×2±½ of rotational frequency

Range (3) estimated frequency×3±½ of rotational frequency

The ranges (1) to (3) are set as a set of inspection frequency ranges. A rotational frequency of a lower-speed gear is preferably used in order to prevent influence of a side band.

Step a3: A maximum peak amplitude is calculated in each of the inspection frequency ranges (1) to (3). At this time, such estimated frequencies that a difference in the maximum peak amplitude between the range (1) and the range (2) is less than or equal to ten times, and a difference in the maximum peak amplitude between the range (2) and the range (3) is less than or equal to ten times, are selected.

Step a4: Such an estimated frequency that the total value of the maximum peak amplitudes in the inspection frequency ranges (1) to (3) is greatest among the estimated frequencies having been selected in step a3, is determined as GMFmh, such an estimated frequency that the total value is the second greatest is determined as GMFlm, and such an estimated frequency that the total value is the third greatest is determined as GMFp. Thereafter, the process is ended.

Figure 7:
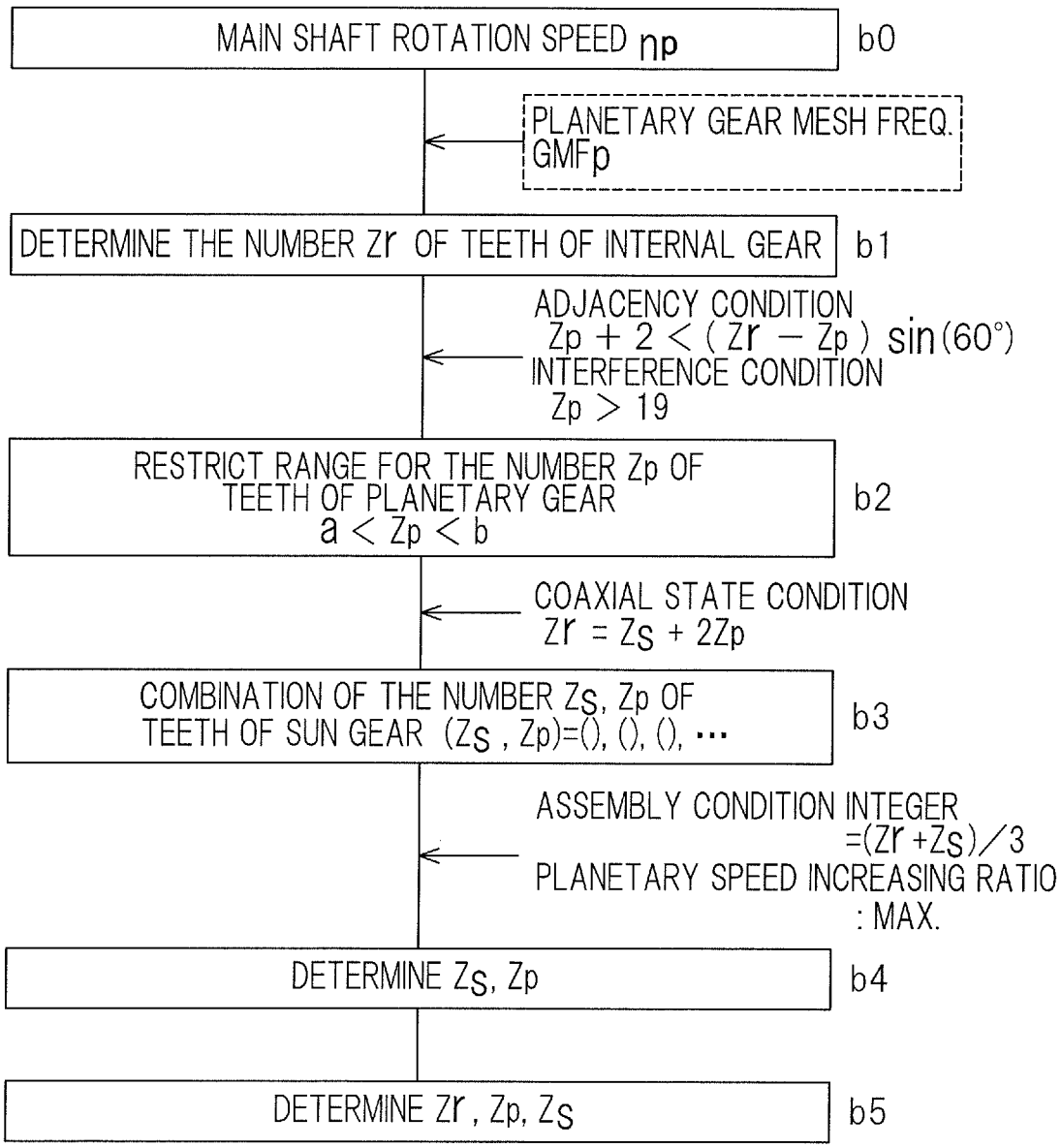
FIG. 7 is a flow chart showing a process step of determining the number of teeth of a planetary gear device of the speed increaser.

An example of an algorithm for determining the numbers (Zr, Zp, Zs) of teeth of the planetary gear device from GMFp, np, and N will be described below. FIG. 7 is a flow chart showing a process step (planetary gear teeth number determining process step) of determining the number of teeth of the planetary gear device. This process step is controlled by the planetary gear teeth number determination unit 46.

Step b1: After the start of the process, np measured by the rotation speed sensor Sb (FIG. 3) (step b0) and the determined GMFp are substituted into Expression (1), to obtain Zr=110.515. By this being rounded up, "111" is determined as Zr.

Step b2: 19<Zp<50 is obtained according to Expression (3) and Expression (5) by using Zr=111 having been determined, whereby a range for the number Zp of teeth can be restricted.

Step b3: In 19<Zp<50, a combination (Zp, Zs), of the number of teeth of the planetary gear and the number of teeth of the sun gear, which satisfies Expression (2) is calculated. The calculated combinations (Zp, Zs) are indicated below. A combination in which at least one of the numbers of teeth is less than or equal to 17 is excluded.

(Zp,Zs)=(20,71)(21,69)(22,67)(23,65)(24,63)(25,61)
(26,59)(27,57)(28,55)(29,53)(30,51)(31,49)(32,
47)(33,45)(34,43)(35,41)(36,39)(37,37)(38,35)
(39,33)(40,31)(41,29)(42,27)(43,25)(44,23)(45,
21)(46,19)

Step b4: Combinations (Zp, Zs) in step b3 which satisfy Expression (4) are determined. The determined combinations (Zp, Zs) are indicated below.

(Zp,Zs)=(21,69)(24,63)(27,57)(30,51)(33,45)(36,39)
(39,33)(42,27)(45,21)

Step b5: The combination in step b4 which has the greatest speed ratio Zr/Zs+1 is (Zp, Zs)=(45, 21). Therefore, the numbers of teeth (Zr, Zp, Zs)=(111, 45, 21) can be determined. The controller 39 controls the display unit 41 so as to display the numbers (Zr, Zp, Zs) of teeth.

Figure 8:
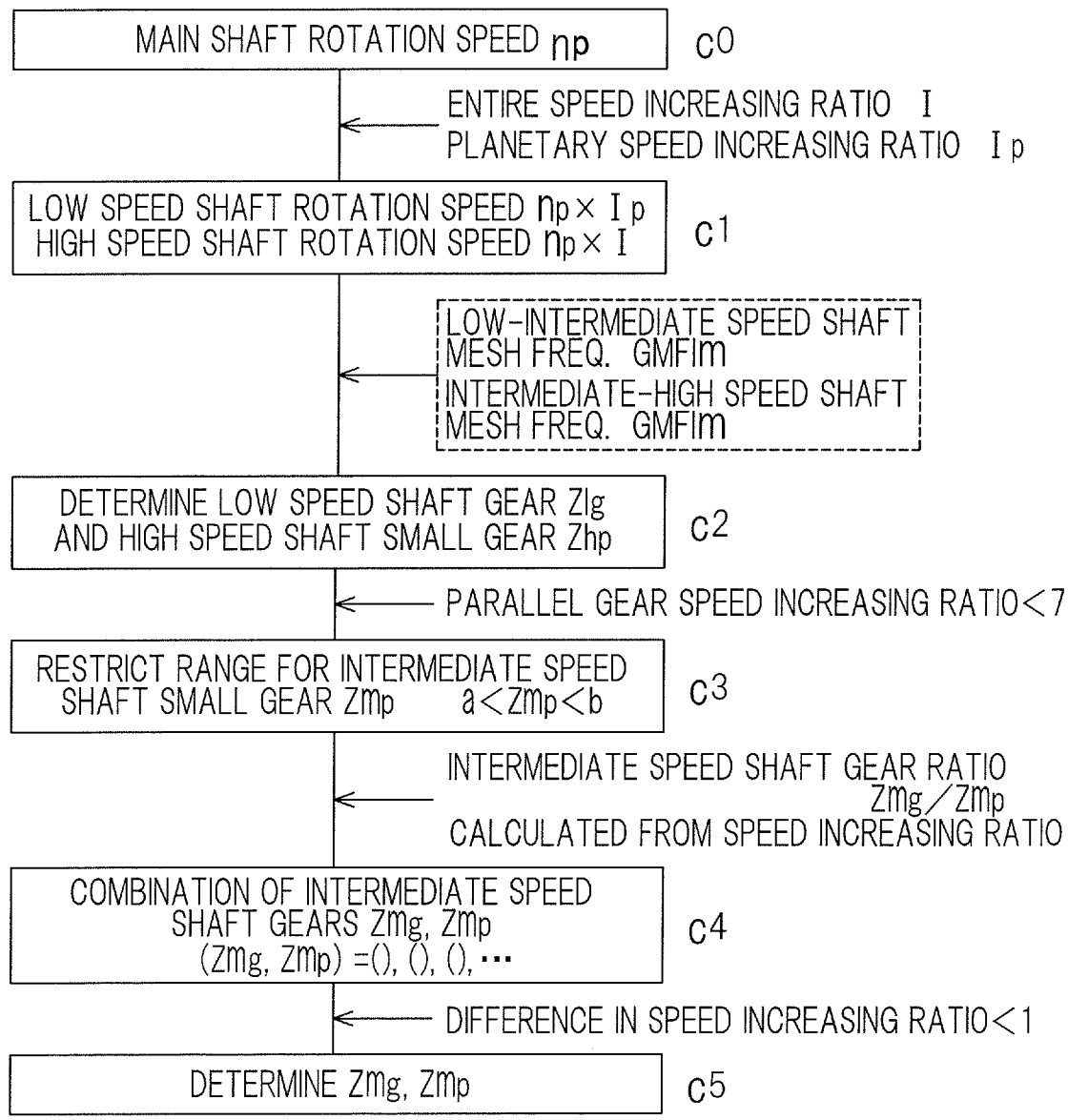
FIG. 8 is a flow chart showing a process step of determining the number of teeth of a two-stage parallel shaft gear device of the speed increaser.

An example of an algorithm for determining the numbers (Zlg, Zmp, Zmg, Zhp) of teeth of the two-stage parallel shaft gear device from GMFlm and GMFmh will be described below. FIG. 8 is a flow chart showing a process step (two-stage-parallel-shaft-gear teeth number determining process step) of determining the number of teeth of the two-stage parallel shaft gear device. The process step is controlled by the two-stage-parallel-shaft-gear teeth number determination unit 47.

After the start of the process, a high speed shaft rotation speed np×I and a low speed shaft rotation speed np×Ip are calculated from the measured main shaft rotation speed np (step c0), I, and Ip (step c1).

The calculated high speed shaft rotation speed np×I and the low speed shaft rotation speed np×Ip, and the determined GMFmh and GMFlm are substituted into Expression (6) and Expression (7) to obtain Zhp=31.866 and Zlg=97.913. By these being rounded up, (Zhp, Zlg)=(32, 98) can be determined (step c2). The values obtained in step c2 are substituted into Expression (8) to calculate the teeth number ratio Zmg/Zmp. 17<Zmp<98 is obtained as the range for Zmp according to the cutting prevention condition and Zlg (step c3). Zing is calculated from the integer Zmp in the range by using the teeth number ratio Zmg/Zmp (step c4). At this time, Zmg is not obtained as an integer due to measurement accuracy for the rotational frequency and the speed increasing ratio in many cases.

When Zmg which is closest to an integer and which satisfies a condition that a difference between the speed ratios Zlg/Zmp and Zmg/Zhp is less than or equal to 1.5 is determined among (Zmg, Zmp) obtained in step c4, (Zmg, Zmp)=(109.981, 23) is obtained. By this being rounded up, (Zmg, Zmp)=(110, 23) can be determined (step c5).

Testing was performed so as to confirm whether or not the meshing frequency and the number of teeth which were determined by using the algorithms were equal to values for a speed increaser including therein gears having known design specifications.

In the testing, the sensor for the determined meshing frequency of each gear pair is as follows.

Meshing frequency of planetary gear: acceleration sensor Sc (FIG. 2) for speed increaser input bearing and acceleration sensor Sd (FIG. 2) for speed increaser planetary bearing Meshing frequency of parallel-shaft-gear low/intermediate speed shaft: acceleration sensor Se (FIG. 2) for speed increaser low speed bearing and acceleration sensor Sf (FIG. 2) for speed increaser intermediate speed bearing Meshing frequency of parallel-shaft-gear intermediate/high speed shaft: acceleration sensor Sf (FIG. 2) for speed increaser intermediate speed bearing and acceleration sensor Sg (FIG. 2) for speed increaser high speed bearing In this testing, vibration was measured for 10 seconds by each of the plurality of acceleration sensors Sc to Sg. N, np, and I as preconditions, and GMFp, GMFlm, GMFmh, Zr, Zp, Zs, Zlg, Zmp, Zmg, and Zhp which are to be determined are indicated below. The units for np, GMFp, GMFlm, and GMFmh are Hz.

TABLE 1

| Precondition | N | 3 |
|---|---|---|
| | np | 0.33 |
| | I | 92.07 |

TABLE 1-continued

| Determined | GMFp | 36.5 |
|---|---|---|
| | GMFlm | 202.4 |
| | GMFmh | 968.8 |
| | Zr | 111 |
| | Zp | 45 |
| | Zs | 21 |
| | Zlg | 98 |
| | Zmp | 23 |
| | Zmg | 110 |
| | Zhp | 32 |

Figure 9:
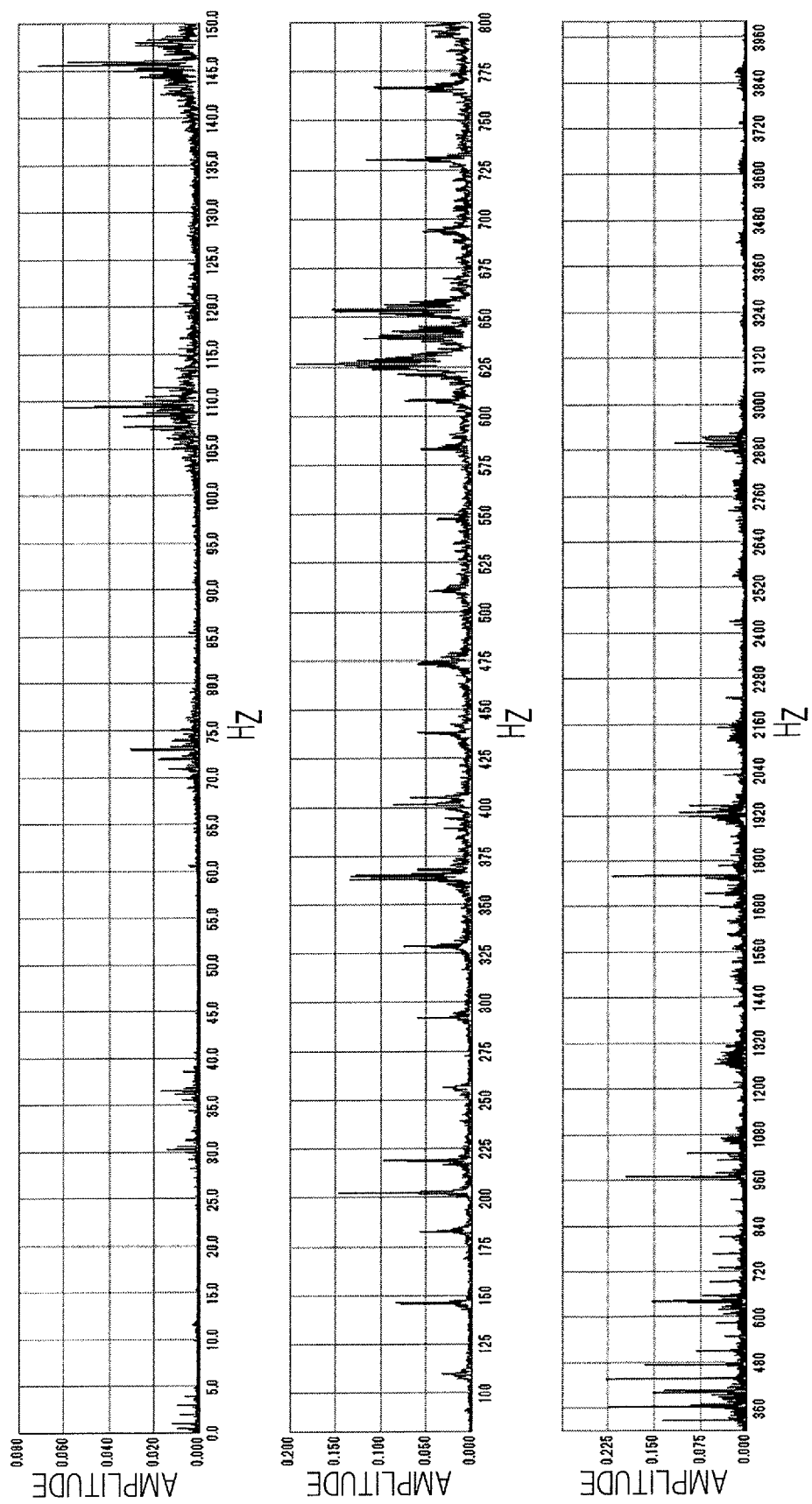
FIG. 9 shows a frequency range for measurement data by each sensor during a rated operation in testing.

Thus, it was confirmed that the meshing frequency and the number of teeth determined by the algorithms of the present embodiment were equal to the values indicated above. FIG. 9 shows the frequency range for the measurement data by each sensor during a rated operation in this testing. In FIG. 9, although a myriad of peaks can be confirmed, a peak representing the meshing frequency cannot be identified.

In the state monitoring system Stm and the state monitoring method using the same, the meshing frequency determination unit 45 determines an estimated frequency having total value of the maximum peak amplitudes calculated in the plurality of estimated frequency ranges, within a predetermined time, being the k-th (k is a natural number) greatest among the selected estimated frequencies, as a meshing frequency of a gear pair having the k-th highest tooth surface speed. The meshing frequency determination unit 45 uses such a phenomenon that the higher the tooth surface speed is, the higher meshing vibration is, in a normal gear pair. Therefore, the meshing frequency, of each gear pair, which is useful for gear abnormality diagnosis can be determined. The controller 39 monitors occurrence of one or both of: increase and reduction of a harmonic component; and a side band, according to the determined meshing frequency, whereby an accurate state monitoring such as calculation of an amount of wear on a tooth surface or a gear abnormality state can be performed.

In the state monitoring system Stm and the state monitoring method using the same, the number of teeth of each of the internal gear 22, the planetary gear 21, and the sun gear 20 of the planetary gear device 15 can be determined from the measurement data. Furthermore, the number of teeth of each of the low-speed-shaft large gear 29, the intermediate-speed-shaft small gear 30, the intermediate-speed-shaft large gear 31, and the high-speed-shaft small gear 32 of the two-stage parallel shaft gear device 16 can be determined. Therefore, a frequency useful for gear abnormality diagnosis can be calculated and a diagnosis accuracy of the state monitoring system Stm can be enhanced.

The state monitoring system Stm may monitor one or both of states of a speed increaser and a speed reducer as a gear device used in, for example, a large-scale plant.

An acceleration sensor is used as each sensor. However, the sensor is not limited only to an acceleration sensor. As each sensor, for example, a speed sensor, a displacement sensor, an ultrasonic sensor, or an acoustic sensor may be used.

Although the modes for carrying out the present invention have been described on the basis of the embodiments, the embodiments disclosed herein are illustrative in all aspects and not restrictive. The scope of the present invention is indicated by the claims, rather than by the above description, and is intended to include any modifications within the scope and meaning equivalent to the claims.

REFERENCE NUMERALS

1 . . . Wind power generator (Wind turbine)
7 . . . Speed increaser (Gear device)

38 ... Teeth number determination device
39 ... Control device (Monitoring unit)
40 ... Meshing frequency determination device
42 ... Harmonic region setting unit
43 ... Inspection frequency range setting unit
44 ... Maximum-peak-amplitude calculation unit
45 ... Meshing frequency determination unit
46 ... Planetary gear teeth number determination unit
47 ... Two-stage-parallel-shaft-gear teeth number determination unit
Sa ... Acceleration sensor (sensor)
Stm ... State monitoring system

What is claimed is:

1. A state monitoring system for monitoring a state of a gear device including a plurality of gear pairs, the state monitoring system comprising
a meshing frequency determination device configured to determine a meshing frequency of the plurality of gear pairs in one or both of a speed increaser and a speed reducer each of which is the gear device,
the meshing frequency determination device including
a sensor configured to detect a meshing vibration occurring in each gear pair,
a harmonic region setting unit configured to perform setting of an upper limit of a multiple of an estimated frequency of the meshing frequency to be inspected as a harmonic region,
an inspection frequency range setting unit in which a plurality of estimated frequency ranges to be inspected for the meshing frequency are set,
a maximum-peak-amplitude calculation unit configured to calculate a maximum peak amplitude from the meshing vibration detected by the sensor, in the estimated frequency ranges set by the inspection frequency range setting unit and in the harmonic region set by the harmonic region setting unit, and configured to select such estimated frequencies that a difference in the maximum peak amplitude between the plurality of estimated frequency ranges, is less than or equal to a predetermined multiple, and
a meshing frequency determination unit configured to determine an estimated frequency having a total value of maximum peak amplitudes calculated in the plurality of estimated frequency ranges, within a predetermined time, being k-th (k is a natural number) greatest among the estimated frequencies selected by the maximum-peak-amplitude calculation unit, as a meshing frequency of a gear pair having the k-th highest tooth surface speed.

2. The state monitoring system for the gear device as claimed in claim 1, comprising a teeth number determination device configured to determine the number of teeth of a single-pinion type planetary gear device having one or both of a speed increaser and a speed reducer each of which has a plurality of gear pairs and each of which is the gear device,
the teeth number determination device including
the meshing frequency determination device, and
a planetary gear teeth number determination unit configured to determine the number of teeth, of the planetary gear device, with which a speed ratio is maximum, from the meshing frequency determined by the meshing frequency determination unit, by using a predetermined teeth number conditional expression for a planetary gear mechanism.

3. The state monitoring system for the gear device as claimed in claim 2, wherein the teeth number determination device is a teeth number determination device configured to determine the number of teeth of a speed increaser for a wind turbine including a planetary single-pinion type planetary gear device having one gear pair and a two-stage parallel shaft gear device having two gear pairs, and
the meshing frequency determination unit is configured to:
determine an estimated frequency having total value of the maximum peak amplitudes calculated in the plurality of estimated frequency ranges, within the predetermined time, being the greatest, as a parallel-shaft-gear intermediate-high speed shaft meshing frequency in the two-stage parallel shaft gear device;
determine an estimated frequency having the total value being the second greatest, as a parallel-shaft-gear low-intermediate speed shaft meshing frequency in the two-stage parallel shaft gear device; and
determine an estimated frequency having the total value being the third greatest, as a planetary gear meshing frequency in the planetary gear device, and
wherein the teeth number determination device further includes a two-stage-parallel-shaft-gear teeth number determination unit configured to determine the numbers of teeth, of the two-stage parallel shaft gear device, with which a difference in speed ratios between the two gear pairs is less than or equal to 1.5, by using the parallel-shaft-gear intermediate-high speed shaft meshing frequency and the parallel-shaft-gear low-intermediate speed shaft meshing frequency both determined by the meshing frequency determination unit, and a speed increasing ratio of the planetary gear device calculated from the number of teeth determined by the planetary gear teeth number determination unit.

4. The state monitoring system for the gear device as claimed in claim 1, wherein the harmonic region setting unit performs setting so as to determine whether or not a harmonic region up to three times an estimated frequency of the meshing frequency is to be inspected.

5. The state monitoring system for the gear device as claimed in claim 1, further comprising a monitoring unit configured to monitor occurrence of one or both of: increase and reduction of a harmonic component; and a side band, based on the determined meshing frequency.

6. A state monitoring method for monitoring a state of a gear device having a plurality of gear pairs, the state monitoring method comprising
a meshing frequency determining process of determining a meshing frequency of each of the plurality of gear pairs in one or both of a speed increaser and a speed reducer each of which is the gear device,
the meshing frequency determining process including
a step of detecting a meshing vibration occurring in each gear pair using a sensor,
a harmonic region setting step of performing setting an upper limit of a multiple of an estimated frequency of the meshing frequency to be inspected as a harmonic region,
an inspection frequency range setting step of setting a plurality of estimated frequency ranges to be inspected for the meshing frequency,
a maximum-peak-amplitude calculation step of calculating a maximum peak amplitude from the meshing vibration detected by the sensor, in the estimated frequency ranges set by the inspection frequency range setting step and in the harmonic region set by the harmonic region setting step, and configured to select such estimated frequencies that a difference in the maximum peak amplitude between the plurality of estimated frequency ranges, is less than or equal to a predetermined multiple, and a meshing frequency determining step of determining an estimated frequency having a total value of maximum peak amplitudes calculated in the plurality of estimated frequency ranges, within a predetermined time, being k-th (k is a natural number) greatest among the estimated frequencies selected by the maximum-peak-amplitude calculation step, as a meshing frequency of a gear pair having the k-th highest tooth surface speed.

7. The state monitoring method, for the gear device, as claimed in claim 6, comprising a teeth number determining process of determining the number of teeth of a single-pinion type planetary gear device having one or both of a speed increaser and a speed reducer each of which has a plurality of gear pairs and each of which is the gear device, the teeth number determining process including
the meshing frequency determining process, and
a planetary gear teeth number determining step of determining the number of teeth, of the planetary gear device, with which a speed ratio is maximum, from the meshing frequency determined by the meshing frequency determining process, by using a predetermined teeth number conditional expression for a planetary gear mechanism.

8. The state monitoring method, for the gear device, as claimed in claim 7, wherein the teeth number determining process is a process of determining the number of teeth of a speed increaser for a wind turbine including a planetary single-pinion type planetary gear device having one gear pair and a two-stage parallel shaft gear device having two gear pairs, and the meshing frequency determining process including:
determining an estimated frequency having total value of the maximum peak amplitudes calculated in the plurality of estimated frequency ranges, within the predetermined time, being the greatest, as a parallel-shaft-gear intermediate-high speed shaft meshing frequency in the two-stage parallel shaft gear device;

determining an estimated frequency having the total value being the second greatest, as a parallel-shaft-gear low-intermediate speed shaft meshing frequency in the two-stage parallel shaft gear device; and determining an estimated frequency having the total value being the third greatest, as a planetary gear meshing frequency in the planetary gear device, and wherein the teeth number determining process further includes a two-stage-parallel-shaft-gear teeth number determining step of determining the numbers of teeth, of the two-stage parallel shaft gear device, with which a difference in speed ratios between the two gear pairs is less than or equal to 1.5, by using the parallel-shaft-gear intermediate-high speed shaft meshing frequency and the parallel-shaft-gear low-intermediate speed shaft meshing frequency both determined by the meshing frequency determining process, and a speed increasing ratio of the planetary gear device calculated from the number of teeth determined by the planetary gear teeth number determining step.

* * * * *